E. J. CODD.
Coffee Polisher.

No. 105,175. Patented July 12, 1870.

Witnesses:
Jas. L. Ewin
Wm. H. Brereton Jr.

Inventor:
E. J. Codd
By Knight Bro
Attorneys

United States Patent Office.

EDWARD JAMES CODD, OF BALTIMORE, MARYLAND.

Letters Patent No. 105,175, dated July 12, 1870.

IMPROVEMENT IN COFFEE-POLISHER.

The Schedule referred to in these Letters Patent and making part of the same.

I, EDWARD JAMES CODD, of Baltimore, in the State of Maryland, have invented an Improved Coffee-Polisher, of which the following is a specification.

Nature and Objects of the Invention.

My invention consists of a cylinder in which are two or more rotating and revolving shafts, arranged in systematic order on each side of or around a central axis or space, and provided with brushes, beaters, paddles, or other means of agitating the berries of coffee placed therein.

The means of rotation are a central and stationary sun-wheel on the axis of the cylinder, and a planet-wheel on each of the beater-shafts.

Description of the Accompanying Drawing.

Figure 1:
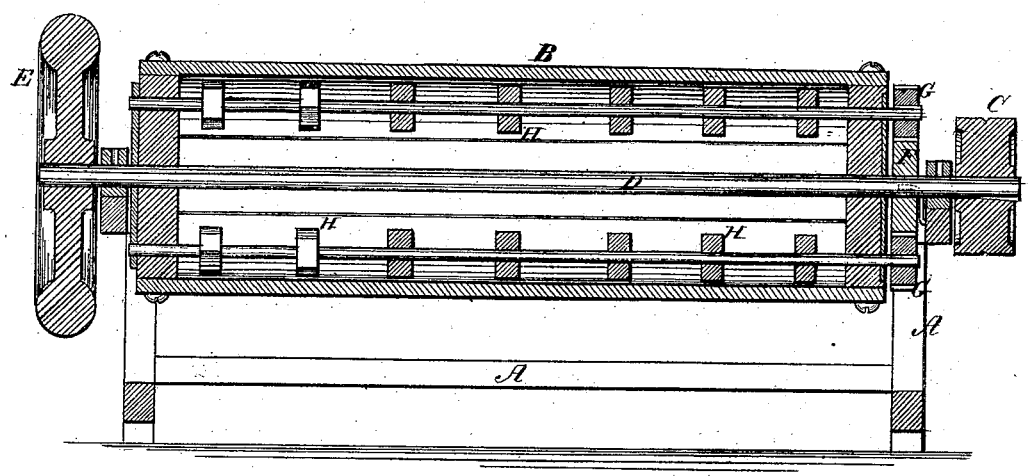
Figure 2:
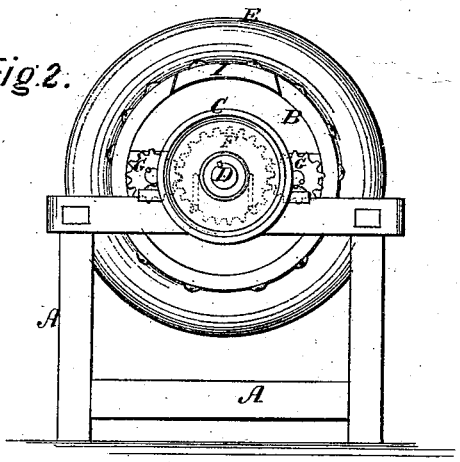

Figure 1 is a longitudinal vertical section.
Figure 2 is an end view.

General Description.

A is the frame of the machine, affording bearings for the rotating-cylinder B, which is driven by a belt on the band-wheel C. The axle D, which passes through the cylinder, is not a necessary feature, as the gudgeons on which the cylinder is supported may be attached to the heads, and the central axis which traverses the interior of the cylinder be dispensed with.

E is a fly-wheel, to equalize the motion.

F is a sun-wheel on the axis, so fastened that it cannot revolve.

G G are two planet-pinions, which mesh into the sun-wheel as the cylinder revolves. The axes of the planet-wheels pass throughout the length of the cylinder, and are provided with paddles, brushes, or other devices, H, to stir the coffee.

The proportions of the cylinder may vary, and the beater-shafts may be 2 3 4 or more, each being driven by a planet-wheel on the end of its shaft, meshing with one common sun-wheel.

The paddles or brushes may be arranged in any desired manner, in a parallel or spiral series, or the beaters may be bars parallel to the beater-axis, and connected by arms to the latter.

The beater-shafts revolve in the same direction with the cylinder, but at greater speed, and the relative rate may be adjusted by proportioning the diameters of the sun and planet-wheels.

The cylinder has doors I on one side, which are opened for receiving and discharging the berries. The doors are fastened by plates and buttons, by hooks, or in any other suitable way.

Operation.

The cylinder being placed below the spouts which deliver the berries into the open door-ways, and the charge of berries being admitted, the doors are closed and the cylinder started in motion.

The action of the berries as they roll upon the inside of the cylinder, and as they are rubbed and stirred by the rotary beaters is such as to clean and polish them by friction.

When the operation is completed the cylinder is stopped, the doors opened, and the openings being brought to the lower side, the coffee is discharged into a box or hopper beneath.

Claim.

What I claim as new is—

The arrangement, in the coffee-polisher herein shown, of the rotating-cylinder B, stationary sun-wheel F, and a series of two or more parallel shafts provided with beaters H, or their equivalents, said shafts driven by the planet-wheels G, which mesh into the said sun-wheel, substantially as and for the purpose specified.

EDWARD JAMES CODD.

Witnesses:
WM. F. ADAMS,
E. F. FLAHERTY.